Figure 1:
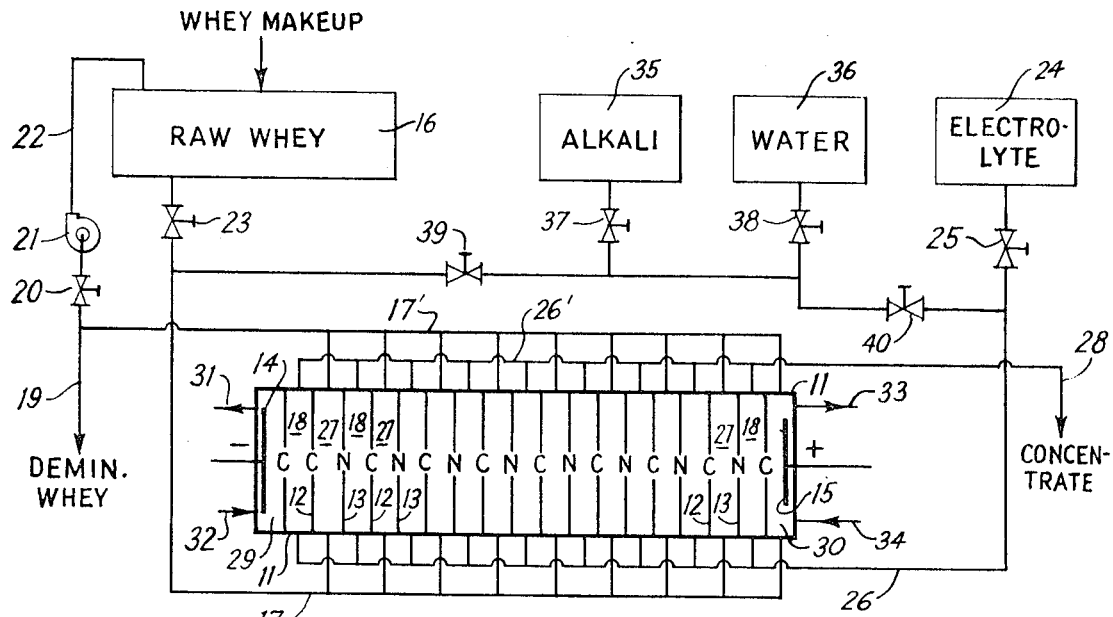

United States Patent

[11] 3,616,386

[72] Inventor John R. Scheder
 Horicon, Wis.
[21] Appl. No. 848,643
[22] Filed Aug. 8, 1969
[45] Patented Oct. 26, 1971
[73] Assignee Purity Electrochemical Company
 Mayville, Wis.

[54] ELECTRODIALYTIC DEMINERALIZATION OF WHEY USING NEUTRAL MEMBRANES
 4 Claims, 4 Drawing Figs.
[52] U.S. Cl. .................................................. 204/180 P,
 204/296
[51] Int. Cl. .................................................. B01d 13/02
[50] Field of Search .................................... 204/180 P,
 301, 296; 99/63, 57, 54

[56] References Cited
 UNITED STATES PATENTS
1,022,523 4/1912 Whitney .................. 204/180 P

| | | | |
|---|---|---|---|
| 2,631,100 | 3/1953 | Aten et al. ...................... | 99/57 |
| 2,758,965 | 8/1956 | Block et al. .................... | 204/180 P |
| 2,848,403 | 8/1958 | Rosenberg ...................... | 204/180 P |
| 2,872,407 | 2/1959 | Kollsman ........................ | 204/301 |
| 3,166,486 | 1/1965 | Hull ................................ | 204/180 P |
| 3,325,389 | 6/1967 | Parsi et al. ...................... | 204/180 P |
| 3,369,906 | 2/1968 | Chen .............................. | 99/77 |
| 3,440,159 | 4/1969 | McRae et al. ................... | 204/180 P |
| 3,484,356 | 12/1969 | Goujard ......................... | 204/180 P |

Primary Examiner—John H. Mack
Assistant Examiner—A. C. Prescott
Attorney—Howard G. Russell ABSTRACT: In the demineralization of whey by electrodialysis in a cell comprising cation membranes and neutral membranes a production period during which whey passes through the cell alternates with a sterilizing and membrane-regenerating period during which alkali is conducted through the cell. Neutral membranes are used which have a carbon-carbon backbone to which nonhydrolizable branches with hydrophilic side groups are grafted.

PATENTED OCT 26 1971 3,616,386

INVENTOR.
John R. Scheder
BY
Howard G. Russell
his ATTORNEY

ELECTRODIALYTIC DEMINERALIZATION OF WHEY USING NEUTRAL MEMBRANES

The present invention relates to improvements in the processing of whey by electrodialysis to produce whey of sufficiently reduced salt content to make the whey fit for human consumption.

This invention is particularly concerned with improvements which adapt electrodialytic practices previously carried out on a laboratory scale to large-scale commercial production.

BACKGROUND OF THE INVENTION

Electrodialytic demineralization in cells comprising a plurality of anion membranes and cation membranes arranged in alternating sequence between terminal electrodes is known and has been successfully applied to the treatment of whey on a laboratory scale. A principal difficulty with the known procedure is caused by the instability of known commercially available anion membranes.

The prior patent to Kollsman U.S. Pat. No. 2,872,407 discloses an improved electrodialysis cell arrangement in which the anion membranes are replaced by neutral membranes. According to the teaching of the patent, the neutral membranes produce an effect comparable to anion membranes, utilizing the phenomenon that ionic solutions tend to remain ionically balanced in the sense that a removal of an anion from a solution requires the simultaneous removal of a cation.

A representative example of a neutral membrane is cellophane. Numerous similar membranes of cellulose derivatives are known and are commercially available.

If used in whey treatment cells, they result in the successful demineralization of whey even though processing problems are encountered by membrane clogging, particularly protein precipitation, calcium precipitation and other problems. My earlier copending patent applications Ser. Nos. 802,766 803,014, 803,015 and 802,848, all filed Feb. 27, 1969, deal with solutions of such specific problems.

PRESENT PROBLEMS

I have found, however, that even with the elimination of precipitation problems, commercial whey demineralization is affected by certain undesirable properties of neutral membranes.

Commercial-scale demineralization of whey by electrodialysis does not only involve the passage of raw whey through the cell and the withdrawal of demineralized product, but sanitary requirements demand periodic cleaning and/or sterilization of the cell, its ducts, chambers and membranes by a cleaning liquid, generally sodium hydroxide solution of considerable concentration.

Also, during sustained periods of operation, proteinacrous matter tends to accumulate on membrane surfaces which, unless removed decreases the current efficiency of the cell. After collection of an appreciable deposit, it is no longer possible to remove it by alkali rinses, but the cell must be disassembled and the membranes be scrubbed by hand.

Industrial demineralization of whey therefore requires the two major and alternating steps of passing whey liquid and passing alkali solution through the cell. This is a significant distinction from laboratory practice and has a profound influence of the membranes.

I observed that cellulose derivative membranes progressively deteriorate in use and that the rate of deterioration is proportional to the number of cleaning cycles involving the use of alkali.

The neutral membranes suffer under alkali treatment by a change in porosity towards progressively larger pore size even though some pore size reduction may occur during each whey processing cycle by the accumulation of protein molecules in the pores.

SOLUTION OF THE PROBLEMS

I discovered that such and other related instability of the process is eliminated by the use of neutral membranes characterized by a continuous unbroken carbon-carbon backbone to which there are attached nonhydrolizable branches with hydrophilic side groups such as hydroxyl or pyrolidone groups.

Representative examples of polymeric materials providing an unbroken carbon-carbon backbone are polyethylene and polypropylene.

To such polymeric material there may be grafted, in a known manner, for example by radiation, branches which are nonhydrolizable either by their very nature, or by reason of curing by cross-linking so as to be unsoluble in aqueous solutions, yet hydrophilic by reason of hydrophilic side groups which then result in swellability in aqueous solutions which distinguishes a neutral semipermeable membrane from polyethylene or polypropylene sheet materials.

A few examples will suffice:

Polyethylene or polypropylene may serve as starting materials.

To the carbon-carbon backbone structure of the starting material polyvinyl acetate may be grafted. Treatment with alkali removes the acetyl groups by hydrolysis leaving principally polyvinyl alcohol branches.

The resulting material is hydrophilic by reason of the presence of OH side groups on the branches.

The foregoing procedure is known and the resulting material is commercially available.

According to another known procedure, polyvinyl pyrolidone is grafted to the carbon-carbon backbone of polyethylene or polypropylene. In this case water swellability of the material results from the presence of pyrolidone side groups of the chains.

Methods are also known by which polyvinyl alcohol branches are cross-linked. The resultant material is water swellable by reason of the presence of hydroxyl side groups and is commercially available under the trade name "Vinnapas".

The various objects, features and advantages of this invention will appear more fully from the detailed description and examples which follow accompanied by drawings illustrating diagrammatically an apparatus for practicing the method and the structure of representative neutral membrane materials. The invention resides in certain new and original use of a known process, composition of matter, or material.

Figures 2, 3:
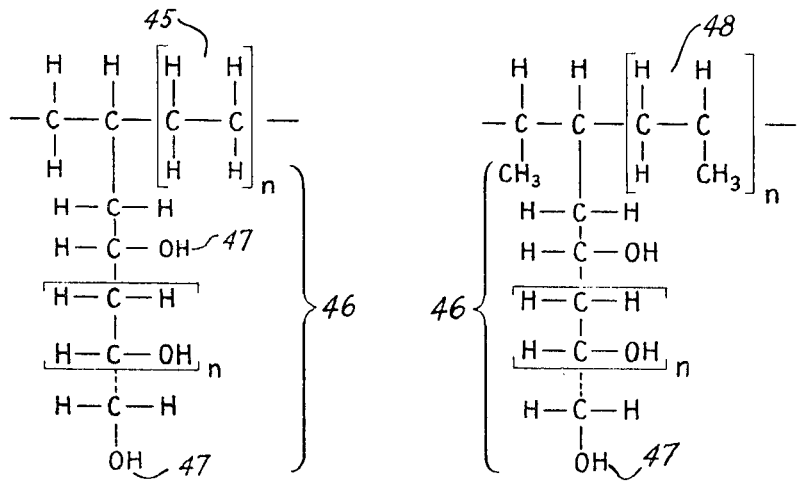
Figure 4:
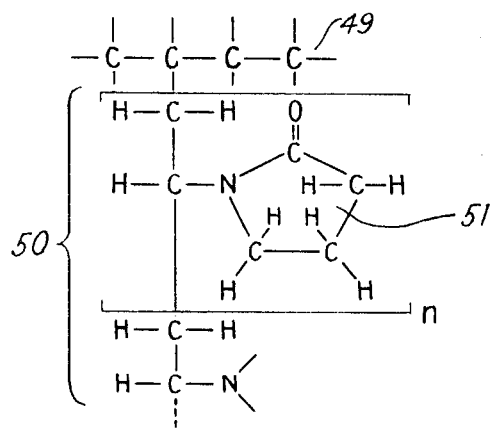

Although the characteristic features of this invention which are believed to be novel will be particularly pointed out in the claims appended hereto, the invention itself, its objects and advantages, and the manner in which it may be carried out may be better understood by referring to the following description taken in connection with the accompanying examples and the drawings forming a part of the disclosure in which:

FIG. 1 is a diagrammatic representation of a basic cell arrangement for practicing the invention; and FIGS. 2 to 4 are structural diagrams of representative membrane materials.

In the following description and in the claims various details will be identified by specific names for convenience. The names, however, are intended to be generic in their application.

The drawing accompanying and forming part of this specification disclose certain specific details of structure for the purpose of explanation of broader aspects of the invention, but it should be understood that structural details may be modified in various respects without departure from the principles of the invention and that the invention may be carried out in other ways than shown.

Referring to FIG. 1, the cell 11 comprises cation-permeable, anion-passage-resistant membranes 12 and neutral membranes 13 in alternating sequence between terminal electrodes 14 and 15 to which a direct electrical potential is applied.

Raw whey flows from a tank 16 through a manifold 17 and passes through every second cell chamber 27 which becomes a deionization chamber in the illustrated arrangement. A portion of the demineralized whey collected in a manifold 17' is withdrawn at 19. Another portion of the product may be recirculated via a valve 20, pump 21 and duct 22. The flow of whey is controlled by a valve 23.

Electrolyte, such as a saline solution, is conducted from a tank 24 via valve 25, manifold 26 through concentrating chambers 18 alternating with the deionizing chamber 27, and a return manifold 26' conducts concentrate to a point of disposal 28.

Electrolyte is conducted through the electrode chambers 29 and 30 through ducts 31, 32, 33 and 34.

From appropriate sources 35 and 36 controlled by valves 37 and 38 alkali and rinse water, respectively, may be conducted through the chambers of the cell 11.

Additional valves 39 and 40 permit alkali and water to be directed through the diluting chambers 27 and concentrating chambers 18, either separately or jointly.

The operation of a commercial whey treating cell is generally, or preferably, keyed to a daily schedule, allowing, for example, 20 hours for whey treatment and the balance of the day for servicing.

Servicing comprises sterilization of the unit and removal of protein accumulation from the membrane surfaces. This is done by passage of alkali of a pH of the order of 12 or 13, up to a caustic level of 20 percent followed by a water rinse.

It is this caustic treatment which adversely affects neutral membranes of cellulosic or other material characterized by the presence, in the backbone, of other atoms than carbon.

In cellophane membranes the hemiacetal oxygen atoms i hemiacetal links are subject to hydrolysis with the result that the water transport of the membrane increases and its physical strength decreases.

The method of demineralizaion of whey by electrodialysis involving the passage of a whey stream and of a stream of alkali through the chambers of the cell in alternating sequence is improved according to the present invention by the use of neutral membranes identified by a continuous carbon-carbon backbone to which there are attached nonhydrolizable branches with hydrophilic side groups.

Branches become nonhydrolizable by the presence of a continuous carbon-carbon chain, to which hydrophilic side groups are attached.

Referring to FIG. 2, the chain of polyethylene 45 has polyvinly alcohol branches 46 grafted to them. Hydroxyl side groups 47 impart hydrophilic properties to the material.

FIG. 3 illustrates a polypropylene chain 48 with polyvinyl alcohol branches 46.

The required hydrophilic properties may be imparted to the membrane material in other ways. Referring to FIG. 4, the carbon-carbon backbone chain generally represented by 49 has polyvinyl pyrolidone chains 50 attached to it.

The pyrolidone ring 51 happens to be a five-member ring. This, however, is not to be taken in a limiting sense, as there are other possibilities including 4 and 9 members. Essential for hydrophilic behavior is only the presence of oxygen and nitrogen atoms in the pyrolidone 51.

Example 1

A multichamber cell corresponding substantially to the cell of FIG. 1 was operated to reduce the salt content of whey to a level of 60 percent. The electric power supply of the cell included a regulator responsive to current and operative to maintain a preset current constant by adjustment of the potential.

Duration of operation: 20 hours followed by a 4 hour service and cleanup period, followed by a 20 hour demineralization, period, and so forth.

Neutral membranes: Polyethylene with polyvinyl alcohol side chains (FIG. 2).

At the beginning of first deionization period: Potential 130 v. Current 90 Amps.

At the end of first deionization period: Potential 150 v. Current 90 Amps.

At the beginning of second deionization period: Potential 155 v. Current 90 Amps.

Within 20 hours the regulator had increased the potential to 200 v. to maintain 90 Amps.

At 5 hours into the third deionization period the limit of available potential 230 v. had been reached. Thereafter the current continued t decrease and upon reaching 60 Amps the operation was terminated.

Disassembly of the cell revealed protein accumulation as the cause of the difficulty.

Example 2

Example 1 was repeated with the modification that after each 20 hours of operation the cell was thoroughly rinsed with 1.25 percent aqueous sodium hydroxide solution for ¾ hour.

This rinse treatment restored the cell to its original condition and no difficulties with protein accumulation were experienced during the following 2 weeks of observation.

The polyethylene/polyvinyl alcohol membranes remained unimpaired as to physical strength and electrodialytic properties.

Example 3

Cellophane membrane pieces were immersed in aqueous sodium hydroxide solution of 1.25 percent concentration and the loss of tensile strength observed.

After 24 hours the loss was 50 percent.

After one week the loss was between 75 and 85 percent.

Comparison pieces of polyethylene/polyvinyl alcohol membranes showed no change in strength.

Comparison pieces of carbon-carbon backbone polyvinyl pyrolidone side chains showed no change in strength.

Example 4

(a) Polyethylene/polyvinyl alcohol membranes, (b) polypropylene/polyvinyl alcohol membranes, and (c) polyethylene/polyvinyl/pyrolidone membranes were immersed in aqueous sodium hydroxide solution of 20 percent concentration for one week producing no detectable change in physical strength.

What is claimed is:

1. Method of demineralization of whey, which method employs an electrodialysis cell comprising alternatingly arranged deionization chambers and concentrating chambers between a pair of electrodes, said chambers being defined by spaced substantially hydraulically impermeable membranes of two kinds arranged in alternating sequence, the membranes of the one kind being selectively permeable to cations sequences passage resistant to anions, the membranes of the other kind being substantially neutral, and which method comprises the alternating sequences of (a) flowing a whey stream through deionizing chambers of the cell, flowing an electrolyte through the concentrating chambers and the electrode chambers of the cell and applying a direct electrical potential to the electrodes and (b) flowing a stream of alkali through chambers of the cell, the method being characterized by the use of a neutral membrane of the type identified by a continuous unbroken carbon-carbon backbone to which there are attached nonhydrolizable branches with hydrophilic side groups.

2. The method according to claim 1 in which the branches proper comprise continuous unbroken carbon-carbon links extending to said backbone.

3. The method according t claim 1 in which said side groups comprise at least one of the group comprising hydroxyl and pyrolidone.

4. The method of demineralization of whey in an electrodialysis cell comprising cation membranes and neutral membranes in alternating sequence the method comprising the steps of passing through chambers of the cell in alternating time sequence whey solution and caustic solution and being characterized by the use of neutral membranes of the type identified by a continuous unbroken carbon-carbon backbone to which there are attached chains comprising continuous unbroken carbon-carbon links extending from said backbone and hydrophilic side groups.

* * * * *